Nov. 15, 1938.   J. R. FREEZE   2,136,943
MANUFACTURE OF HELICAL LOCK SEAM PIPE
Filed Jan. 2, 1936   10 Sheets-Sheet 1

INVENTOR
JONATHAN ROY FREEZE.
BY Allen & Allen
ATTORNEYS.

Nov. 15, 1938. J. R. FREEZE 2,136,943
MANUFACTURE OF HELICAL LOCK SEAM PIPE
Filed Jan. 2, 1936 10 Sheets-Sheet 3

INVENTOR
JONATHAN ROY FREEZE.
BY
ATTORNEYS.

Nov. 15, 1938.  J. R. FREEZE  2,136,943
MANUFACTURE OF HELICAL LOCK SEAM PIPE
Filed Jan. 2, 1936   10 Sheets-Sheet 4
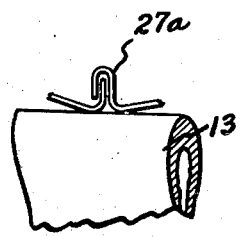
FIG.4.
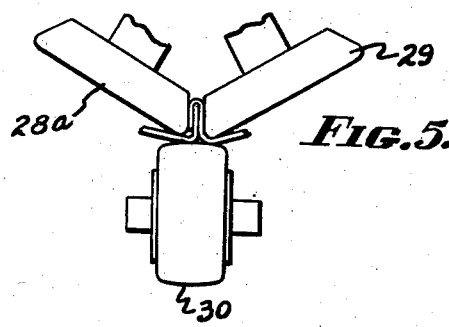
FIG.5.
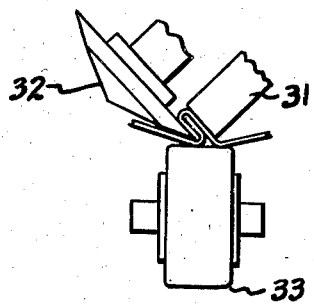
FIG.6.
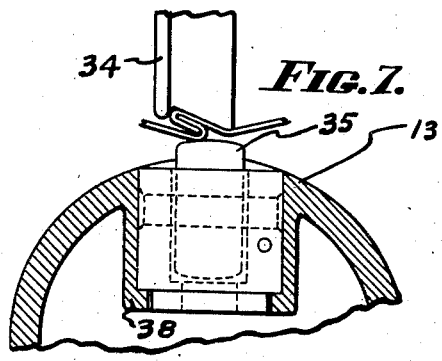
FIG.7.
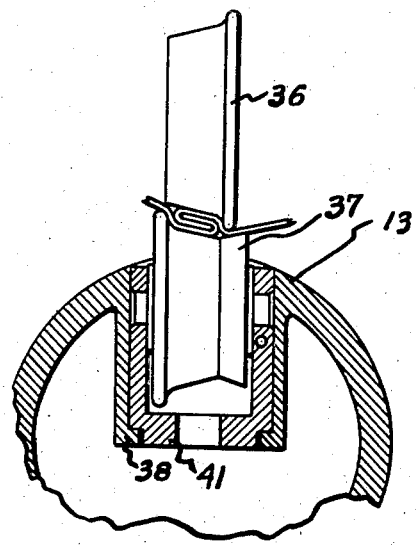
FIG.9.
FIG.8.
INVENTOR
JONATHAN ROY FREEZE.
BY
Allen & Allen
ATTORNEYS.

Nov. 15, 1938.  J. R. FREEZE  2,136,943

MANUFACTURE OF HELICAL LOCK SEAM PIPE

Filed Jan. 2, 1936  10 Sheets-Sheet 5

INVENTOR.
JONATHAN ROY FREEZE.
BY Allen & Allen
ATTORNEYS.

Nov. 15, 1938.     J. R. FREEZE     2,136,943
MANUFACTURE OF HELICAL LOCK SEAM PIPE
Filed Jan. 2, 1936     10 Sheets-Sheet 6

INVENTOR
JONATHAN ROY FREEZE.
BY
Allen & Allen
ATTORNEYS.

Nov. 15, 1938.   J. R. FREEZE   2,136,943
MANUFACTURE OF HELICAL LOCK SEAM PIPE
Filed Jan. 2, 1936   10 Sheets-Sheet 7

INVENTOR
JONATHAN ROY FREEZE.
BY
ATTORNEYS.

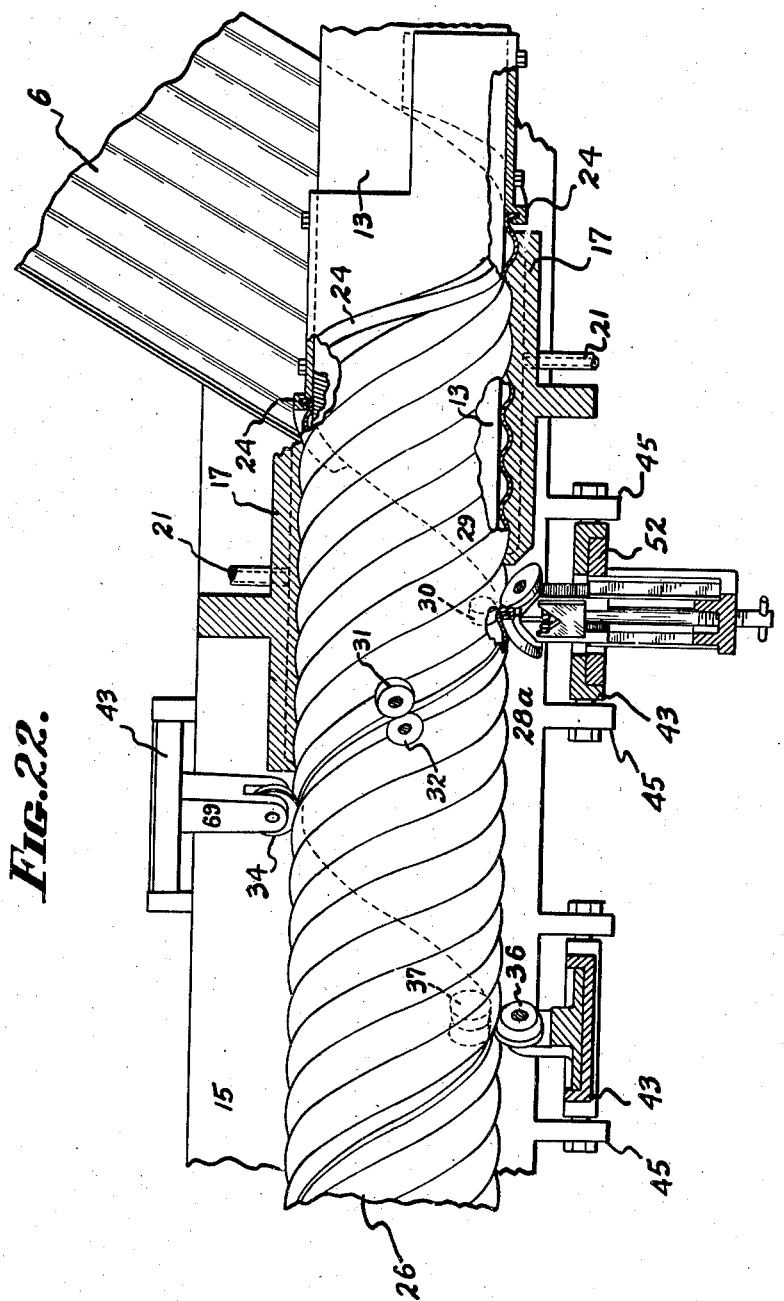

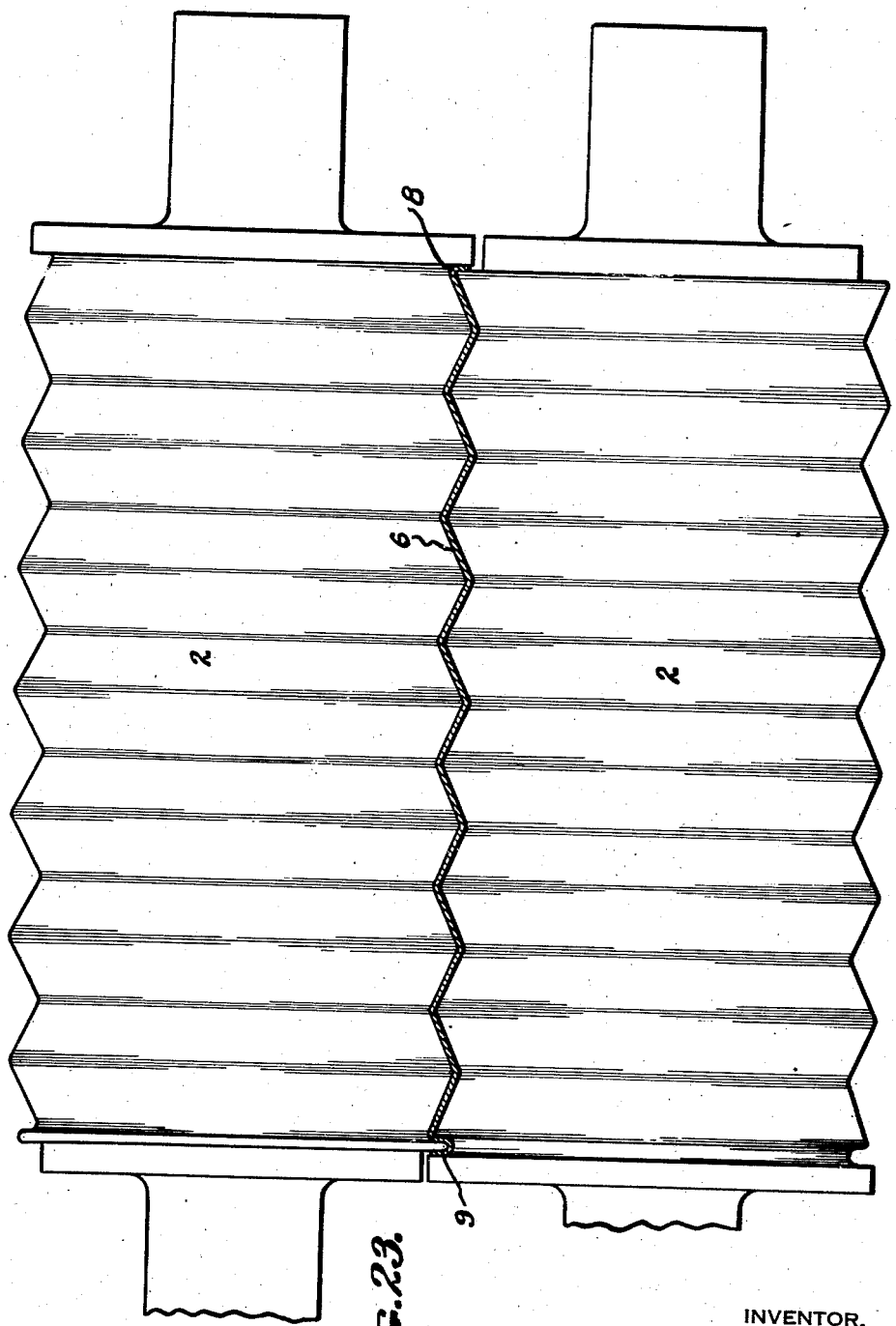

Nov. 15, 1938.       J. R. FREEZE       2,136,943
MANUFACTURE OF HELICAL LOCK SEAM PIPE
Filed Jan. 2, 1936       10 Sheets-Sheet 10
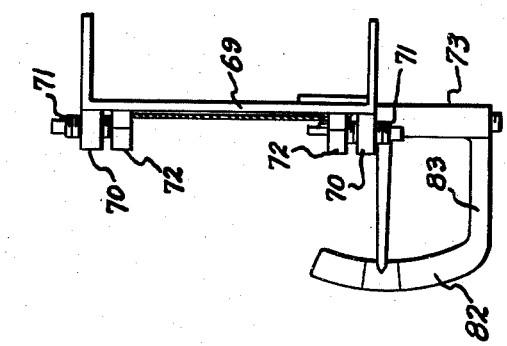
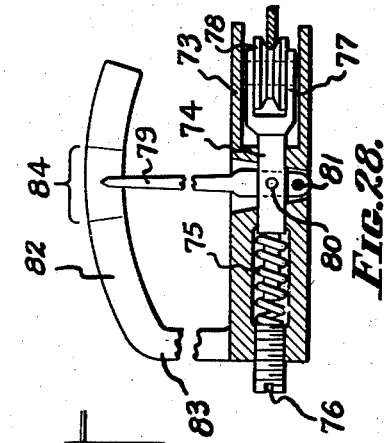
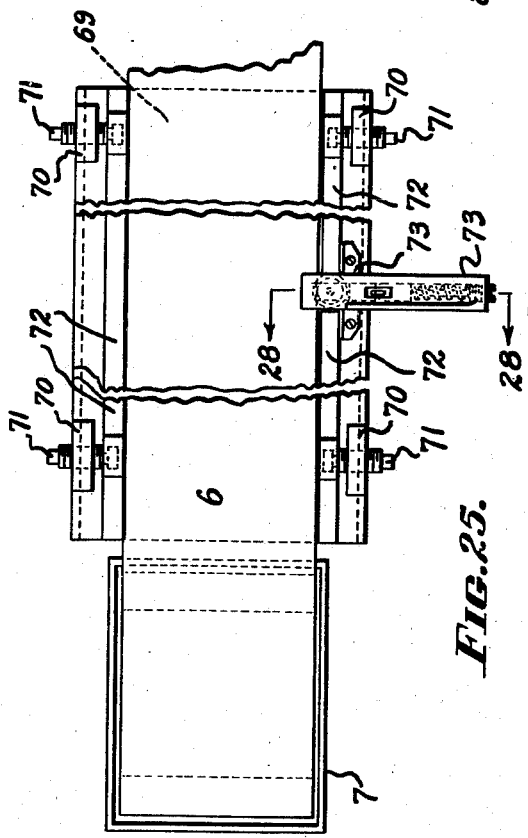
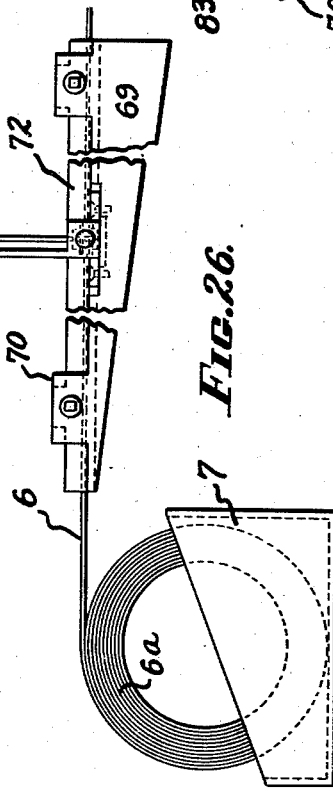
INVENTOR
JONATHAN ROY FREEZE.
BY *Allen & Alle*
ATTORNEYS.

Patented Nov. 15, 1938

2,136,943

UNITED STATES PATENT OFFICE 2,136,943

MANUFACTURE OF HELICAL LOCK SEAM PIPE

Jonathan Roy Freeze, Middletown, Ohio, assignor to The American Rolling Mill Company, Middletown, Ohio, a corporation of Ohio Application January 2, 1936, Serial No. 57,163

12 Claims. (Cl. 113—35)

There have been in the art a number of suggestions for the manufacture of pipe from strip stock by forming the stock into a helix, the convolutions of which lie adjacent each other and joining the convolutions where they meet. It has been suggested, for example, to form upon one edge of sheet or strip stock a flange and on the other edge a U-shaped bead, the stock being plain or corrugated. It has been further suggested to form such stock into the helix aforesaid so that the flange enters the bead, after which the bead is clamped or collapsed against the flange, and the seam structure is laid over against the pipe thus formed, usually as concurrent operations.

A very large number of ways have been suggested for forming the stock into the helical shape, and most of these ways would be operative or could be made operative if it were possible commercially to secure strip stock which is free from camber and absolutely uniform as to gauge and temper. This ideal situation is one, however, which cannot be attained in practice. Commercially obtainable strip stock is characterized by sporadic and considerable variations in substantially all of the particulars mentioned, and the devices of the prior art have not been found adequate to cope with these irregularities in the continuous production of a merchandisable article. Indeed, so far as I am aware prior to my work as set forth in this application and in a copending case to which reference will hereinafter be made, no one has succeeded in a commercial endeavor to manufacture helical lock seam conduit of a size suitable for culvert or drainage work.

In the co-pending application referred to, which is entitled Method and apparatus for making helical lock seam culvert, Serial No. 749,579, filed October 23, 1934, I have taught a method and means for making helical lock seam conduit which involves a principle which may be termed diminishing elasticity. The corrugated stock is formed into the helix about a mandrel, interengaging parts of the seam are linked together and clamped; and the tilting operation is carried on in a progressive manner. The clamping and tilting employ means which are free to wander with the seam as the seam wanders due to camber and other inequalities in the strip. The final forming device or devices are driven in such a way as to propel the helical conduit, thereby tending further to cause the seaming elements to interengage properly, and to minimize the effect of camber and other variations by taking these up in slight variations of diameter. This method has proved successful and many thousands of feet of helical lock seam culvert have been made by me and under my direction by the method and machine set forth in the said application.

My present invention has to do with an improvement in the manufacture of helical lock seam conduit, and while related in ways which will be apparent upon comparison of the two cases, nevertheless follows quite a different principle of operation.

In the present invention the strip is formed into the desired helix by being forced into and through a forming member which is rigid both as to its configuration and as to its position in space as respects other parts of the machine. Means are provided for the positive location, axially of the mandrel, of the seam positions as the strip moves helically, so that the seam forming and shaping devices as a whole can and do occupy a fixed position axially of the mandrel. As will be explained hereinafter, some movement or play may be provided in the first one or two of the seam forming instrumentalities, but this movement has for its purpose primarily only the accommodation of inequalities or variations in the seam elements themselves as distinguished from variations in the position of the seam axially of the mandrel. As a consequence, axial wandering of the seam forming devices is no longer a necessity, and it is only necessary to provide for movement or play thereof in a direction substantially radial to the mandrel to take care of those slight inequalities of diameter of the conduit invariably produced by camber or other inequalities in the strip. In my present apparatus variations in the strip stock are translated into inconsiderable variations in diameter of the finished conduit in a very much more perfect way. While with the machine of my copending application I have attained successful commercial operation, yet with the machine of this invention, and by a method herein set forth, I have been able day after day and continuously to turn out helical lock seam pipe having uniformly perfectly formed seams and free of those strains which in the past have sometimes caused failure of the material elsewhere than in the seams.

The general and specific objects of my invention will be clear to those skilled in the art upon reading these specifications, and upon consideration of the annexed drawings, wherein:

Figs. 4, 5, 6, 7, 8 and 9 are illustrative of successive steps in the seaming operations, and the rollers, and other instrumentalities used in these operations. The mountings of the external seaming rollers are not shown in these figures; but Figs. 7 and 9 show mountings for those hold-out rollers which are located in the mandrel.

Fig. 22 is a partial plan view of the mandrel with the top plate removed, together with that seaming roll holder which is held by it. A portion of the external sizing member and of the first seaming unit are shown in section.

Fig. 23 is a fragmentary sectional view of the last pair of corrugating rolls showing the bead and the flange, taken on the line 23—23 of Fig. 3.

Fig. 24 shows a portion of the external sizing member and the mandrel, with roller means for elevating the flange.

Figs. 25, 26, 27 and 28 illustrate the camber gauge and guiding mechanism, Fig. 28 being a sectional view taken along the lines 28, 28 of Fig. 25.

Figure 1:
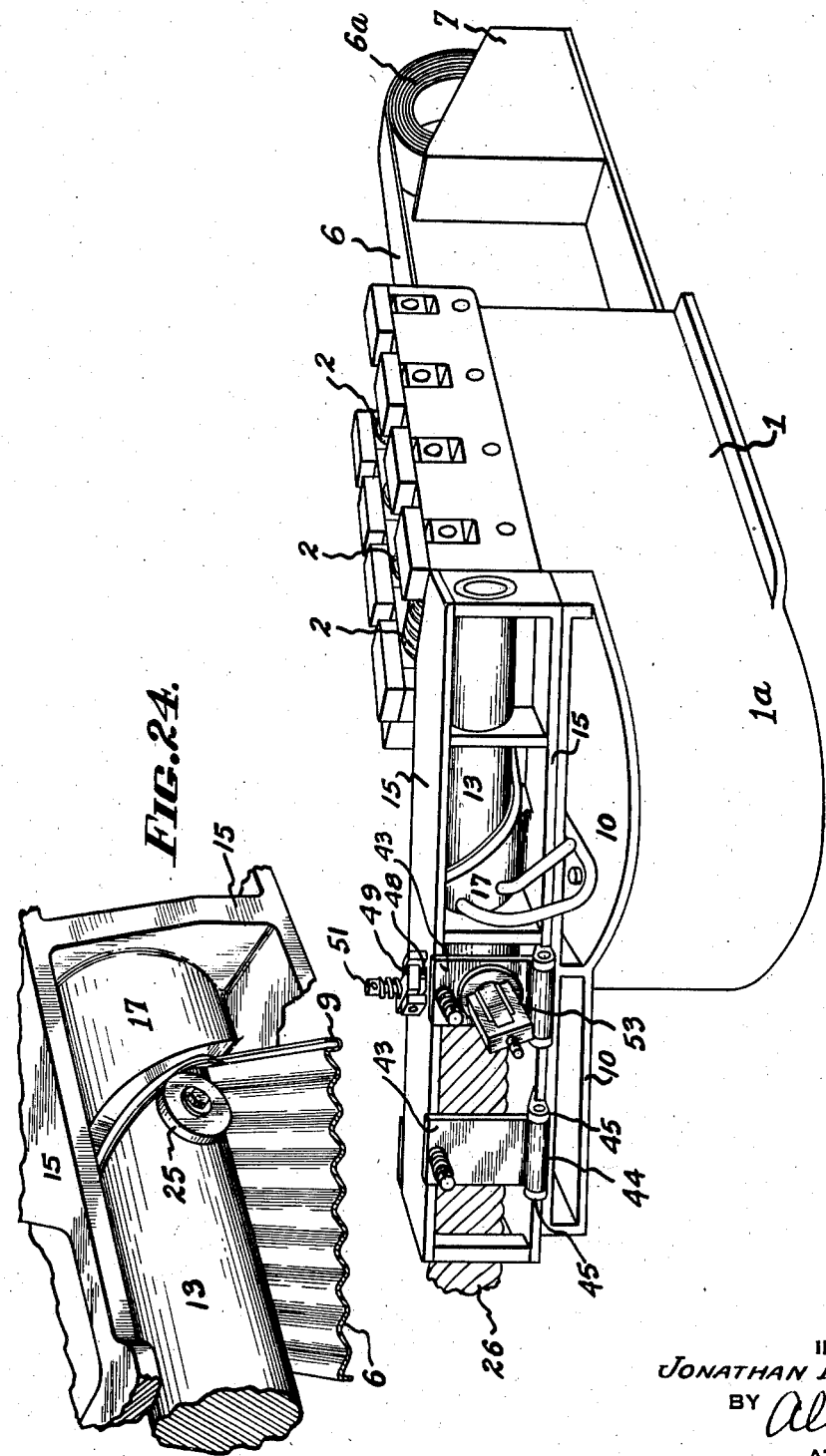
Figure 1 is a perspective view of my machine.

In the making of helical pipe, a strip of metal is fed by suitable means to a mandrel at such an angle to the axis thereof as to cause the strip to form helical convolutions thereabout, with the edges of the convolutions meeting. One side of the strip so fed is provided with an L-shaped flange, and the other sdie with a U-shaped bead. When the helical convolutions meet, the flange is caused to enter the U-shaped bead, and a seam is formed by pressing the bead on the flange and laying the flange and bead down against the helical pipe. As thus far described in this paragraph, the procedure embodies suggestions which are old in the art.

My novel method and apparatus will presently be described in detail, and because such a description embodies specific reference to a large number of parts, the operations of which coact to produce the desired final result, I shall first briefly outline the salient features of my process in order that the correlation of the various parts may be more readily understood. Briefly, therefore, in the practice of my invention a strip is fed across a table between a series of pinch rollers, which not only act to form the flange and bead to which I have referred, but also act, if desired, to corrugate the strip longitudinally, as will hereinafter be more fully explained, and finally serve as driving means for the strip in the subsequent forming operations. The strip is fed to a mandrel, about which it is formed in the helical convolutions aforesaid. Where different sizes of pipe or conduit are to be made, different sizes of mandrel will, of course, have to be used; but it is not necessary to vary the width of the strip for pipe or conduit of different diameter. Rather, the diameter of the pipe may be taken care of by properly relating the angularity of the mandrel to the direction of feeding of the pinch rolls, with relation to the size of the mandrel, as will be readily understood. As a consequence, I prefer in practice to provide a fixed table for forming and feeding the strip in the flat, and then a table pivoted with respect thereto, so that the angularity of this table may be adjusted with relation to the direction of feed of the strip. On this swingable table, mandrels of various different sizes may be fastened, so that the machine may be set up for the manufacture of pipe or conduit of different sizes. Of course it would be possible to provide a fixed mandrel table and a swinging feeding table, but this is ordinarily not so convenient, both because the feeding table is a weightier and bulkier part of the apparatus, and also because in commercial production a fixed point in direction of delivery of the pipe is much to be desired. In feeding the formed strip to the mandrel, I prefer to feed it beneath the mandrel, since, when this is done, the theoretical limit of the size of mandrel which may be used is the ceiling of the building or room in which the apparatus is located, whereas, if the strip were fed to the mandrel over the top of the mandrel, the theoretical limit of mandrel diameter would be the distance between the feeding level of the strip and the floor of the building or room. However, the principles of my invention hereinafter to be described are applicable to either method of feeding.

About that portion of the mandrel to which the fed strip first comes, I locate a fixed external sizing member, which forms a sort of sheath about the mandrel at this point. Where a corrugated pipe or conduit is to be made, this sheath or external sizing member is corrugated on its inner surface. Where smooth pipe is to be made, the sheath or sizing member will be smooth on its inner surface. The fed strip is forced by the feeding and forming rolls into the space between the mandrel and this fixed sheath or external sizing member; and this member performs the following functions: It serves first to bend the strip into the desired helical convolutions. It serves second, in connection with such external supplementary forming or locating means, as will hereinafter be described, to lead the bead and flange of adjacent convolutions into interengagement. It serves, third, to locate the seam thus formed positively, longitudinally of the mandrel, wherefore it is neither necessary to provide seam forming means which are adapted to wander longitudinally of the mandrel, nor to provide driving means for the formed pipe to insure a more perfect interengagement of the seam elements. Needless to say, in order to perform these functions, the sheath or external sizing element must be very rigid and positively located with respect to the mandrel and the feeding table. In practice, my external sizing members are made of cast iron, and are bolted to the mandrel frame and supporting means.

It will be clear that when the strip is forced into the space between the external sizing member or sheath, considerable friction is developed between the strip and the sheath, which it may be necessary to relieve, particularly when a galvanized strip is being formed into helical lock seam conduit, in order to obviate burning of the galvanized coating. Various measures of relief may be adopted, but the one which I have found most economical, as well as entirely satisfactory, is to feed into the space between the strip and the external sizing member a lubricating liquid. To this end, distribution slots, preferably substantially parallel to the longitudinal axis of the mandrel, are cut in the inner face of the external sizing member, and ports are made in the member to permit the delivery of lubricating fluid under pressure to these slots. A good lubricating fluid to use is the ordinary so-called screw cutting compound, which is a water solution of soap. This solution escapes about the edges of the external sizing member and may be caught and reused.

Because of the action of the external sizing member or sheath, as has been said, the seams become positively located axially of the mandrel, as the helical formation of the conduit progresses. As a consequence, it is possible to employ seaming rollers which are also positively located longitudinally of the mandrel, and which need not wander in that direction. It is necessary only to provide for some play in the external seaming rollers in a direction radial to the mandrel to take care of those slight inequalities in the diameter of the pipe being formed, which result from unavoidable sporadic camber in the strip material being fed to the machine. The first of the seaming rollers may be given some play in several directions, as will hereinafter be described. The purpose of this, however, is simply to accommodate inequalities in the seam elements themselves, as distinguished from variations in the seam position longitudinally of the mandrel. The mandrel itself has built into it hold-out rollers to eliminate friction where the external seam forming rollers engage the pipe and tend to press it against the mandrel. These rollers may be made angularly adjustable; by reason of the action of the external forming member or sheath, as aforesaid, once the proper angular relationship of the internal and external seam forming rollers has been determined, the rollers may be located in the adjusted position and kept there throughout the whole period of operation. Continuous or automatic adjustment of the angularity of the various seam forming instrumentalities is thus obviated in my invention.

Hence, for forming pipe or conduit of different diameters, I provide mandrels of various sizes, each in an appropriate frame to be attached to the swinging table aforesaid, and each with an external sizing member or sheath appropriate to the particular mandrel. These frames carry mounting means for the various external seaming rollers, appropriately located longitudinally of the mandrel. The external seam forming rollers and their holders are interchangeable between the various mandrels and associated apparatus, and the mountings are preferably so constructed that the act of attachment of the roll holders thereto serves both to locate the external seaming rolls in the proper position longitudinally of the mandrel, and to fix the rolls themselves in the necessary angular position. The amount of apparatus for making pipe of various diameters is thus greatly cut down, and the operation of setting up the apparatus for making pipe of a different diameter is very greatly simplified.

In the manufacture of helical pipe, I provide strip in rolls, and when one roll is exhausted, I weld the leading end of the next roll to the trailing end of the exhausted roll. This may be done in any suitable way, as by gas or electricity, after the strip edges are sheared true and butted; and any excess metal at the weld may be removed by a suitable flash cutter or grinder. Thus the operation of making a single diameter of pipe need never be interrupted for a re-threading of the forming and feeding devices. If suitable loopers or accumulators are employed, the operation may be made truly continuous, a flying cut-off device being used to sever the formed pipe into convenient lengths for use or shipment. Where a flying cut-off is not used, the welding operation may conveniently be performed during a stoppage of the machine for cut-off purposes. My machine is such that it may be stopped at any time during the operation, and started again, without adjustment of the various instrumentalities.

I have found that with the mechanism and process to which I have referred, I am able to make continuously corrugated or plain helical lock seam pipe with perfect seams, and without splitting of the metal, using strip for raw material, which has the ordinary commercial amount of camber. Ordinarily the camber in strip is sporadic and non-cumulative, so that in most ordinary operations, no adjustment is to be made during the operation of the machine to take care of camber. Where, however, camber tends to be cumulative, as occasionally happens, an adjustment can be made in the direction of movement of the strip as it passes to the forming and feeding rolls. To this end, a feed table is provided having guides to determine the direction of such movement. The table bears a camber gauge, which ordinarily can vary between quite wide limits. Where the gauge is seen to be passing beyond these limits, provision is made for a rapid adjustment of the guides during operation of the machine, until the gauge again reads within the permissible variation range.

Having thus described the general assembly and functioning of my apparatus, I now proceed to a specific description of the various parts and their functions.

Figure 2:
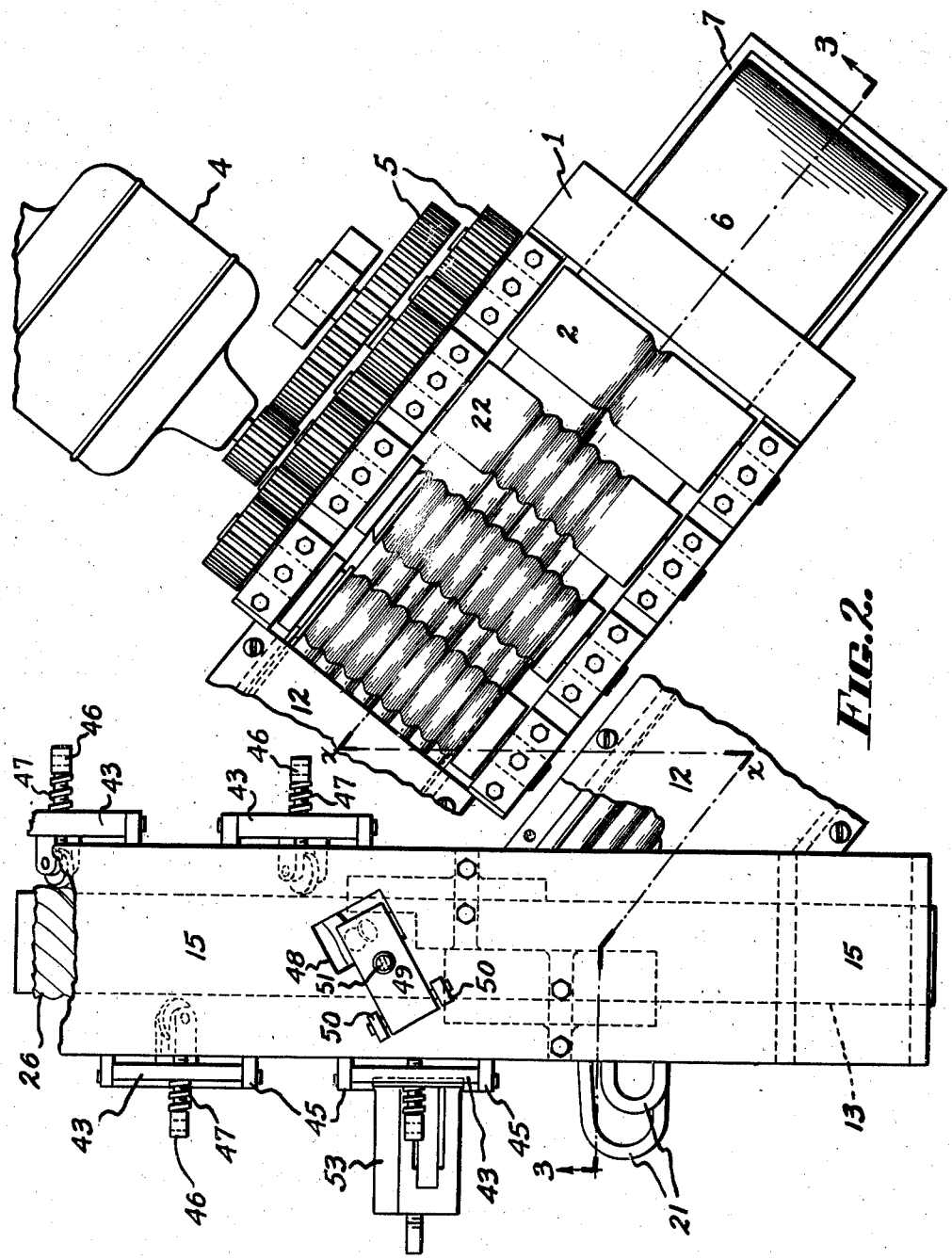
Fig. 2 is a plan view of the machine of Fig. 1, part of the machine being displaced with reference to another part in order to avoid reducing the scale. In reading this figure, the points marked x—x should be understood as coinciding.
Figure 3:
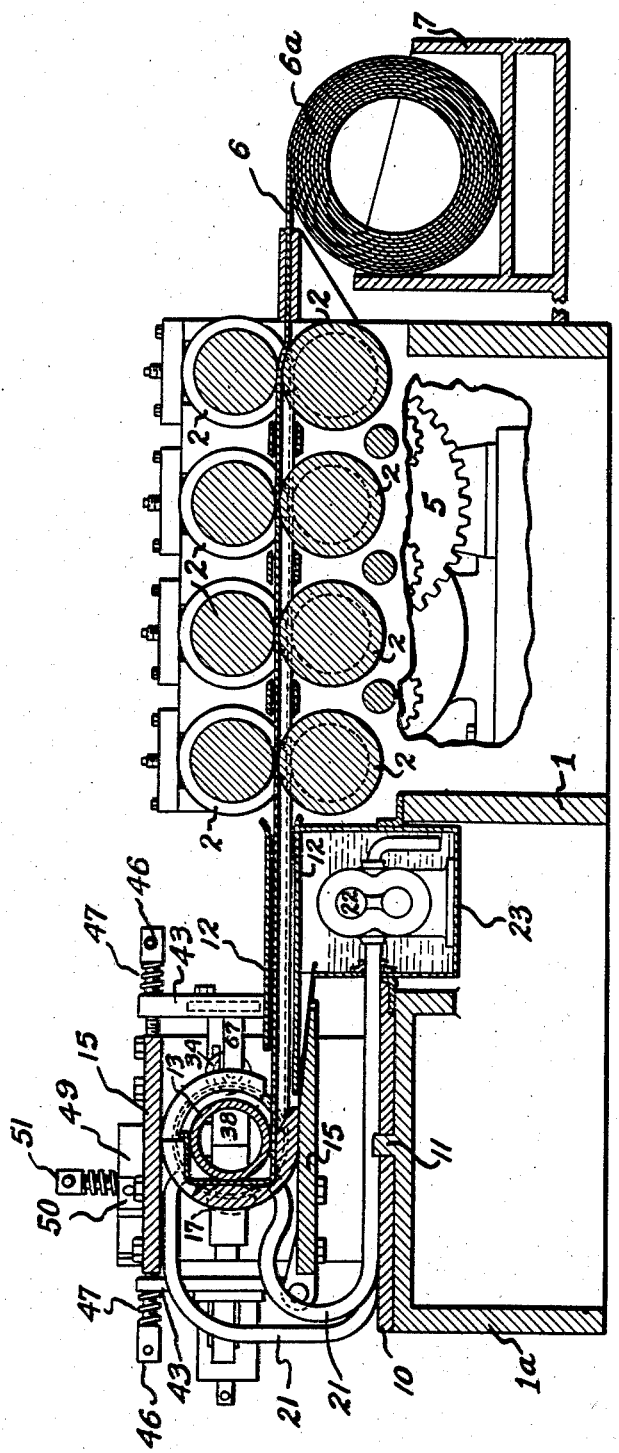
Fig. 3 is a sectional view taken along the lines 3, 3 of Fig. 2.

The general arrangement of the apparatus will be most readily appreciated from Figs. 2 and 3. In these figures, for the sake of clarity, the feeding table has been omitted. The machine comprises a main body 1, in which are journaled a plurality of forming and corrugating rolls 2. Where corrugating is to be done, the pairs of rolls will have matching corrugations formed in the surfaces thereof. In making corrugations, in order to accommodate the desirable contraction of the sheet, it is preferable, in accordance with well known practices, to form first a central corrugation, then the two adjacent ones, and so on, using as many of the rolls as may be necessary to accomplish this result by what is essentially a bending of the metal, rather than a drawing thereof. In the figures, for the sake of simplicity, only four forming rollers have been shown. In practice, for strip materials of ordinary widths and for the formation of corrugations of the ordinary pitch and depth, more rolls may be employed, and it is within the skill of the worker in the art to elongate the feeding device to incorporate as many pairs of pinch rolls as may be deemed desirable. The rolls will, of course, be mounted, and the pressure between them controlled, by ways well known in the art; and the rolls may be arranged to be driven by a motor 4, through suitable gearing or other drive indicated generally at 5. The strip 6 may be fed to the forming and feeding device from a roll 6a, carried in a suitable decoiling box 7, or otherwise. The strip, in passing through the forming and feeding rolls, may be corrugated, if desired, as I have indicated, and will also have formed therein, a depending flange 8 (in Fig. 23), and a U-shaped bead 9, open at the top. I have found it advantageous in forming these not to attempt to form both of them completely and simultaneously in one operation. Much strain is avoided in the metal by forming the bead and the flange gradually, and by a series of progressive forming operations.

The forward end of the frame of the machine terminates in an extending portion 1a, which may, with advantage, be semi-circular in cross-section. This portion forms a support for the mandrel table indicated generally at 10 in the various figures. This table is pivoted upon the extension 1a, as at 11 (Fig. 3) in a prolongation of the center line of the formed strip, as it is being fed. Thus when a change of mandrel is effected by bolting a different mandrel with its frame and associated apparatus to the mandrel table 10, this table may be swung about the pivot 11 to bring it to the proper angularity for the formation of helical pipe of different diameters from strip of the same width when formed up. A suitable scale may be provided in connection with the mounting of the mandrel table to indicate the proper angularity for various predetermined sizes of pipe, so that the setting of the table to this angularity can be accomplished with speed and accuracy. Suitable means for fixing the table in the angularly adjusted position are provided.

Since the feeding, as well as the formation of the corrugated strip is accomplished by the pinch rolls 2, it is advisable to provide means preventing the buckling of the formed sheet as it is thrust by the pinch rolls into the space between the external sizing element and the mandrel. To this end, upper and lower supports for the strip are provided between the final feeding rolls and the mandrel. These may be plate-like members as shown at 12 in Figs. 2 and 3, but other means may be substituted, such as a series of closely spaced, small transverse rollers.

Figure 19:
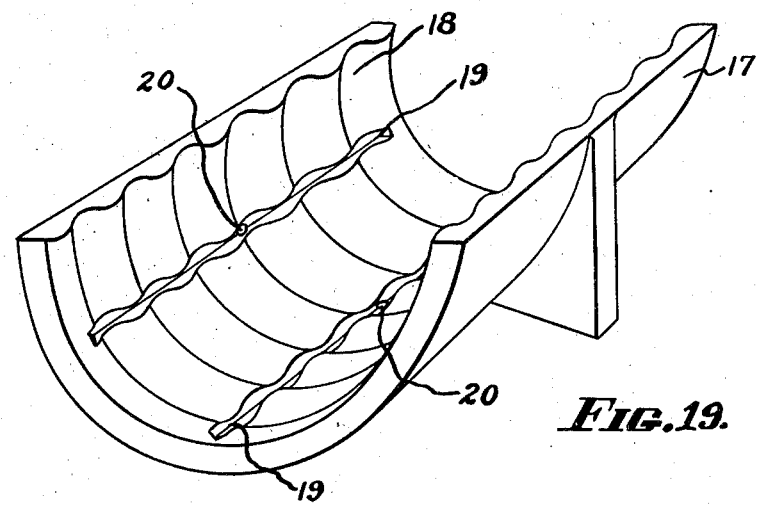
Fig. 19 is a perspective view of a portion of the external sizing member which is used for forming the strip into the helix.

Each mandrel 13 is fixed at one end in a frame-like mandrel housing 15, designed for attachment to the mandrel table 10. As hereinabove indicated, the level of the bottom of the mandrel in the mandrel housing is the same as the level of the top of the form strip being fed thereto, so that the formed strip is bent up and around the mandrel to make the helical convolutions. About the mandrel and firmly affixed to the mandrel housing, there is an external forming member indicated generally in the figures at 17. This member is generally helical in shape, since one of its purposes is to bend and guide the strip into the desired helical convolutions. As indicated in Figs. 19 and 22, the external sizing element, when designed for use with corrugated strip, will have appropriate corrugations milled on its inner surface, as at 18. The fact that these corrugations do not follow the circumference of a circle but are helically disposed, is difficult to show in a sectional figure such as Fig. 19; but the disposition of the helical configurations will be clearly appreciated, it is believed, from Fig. 22. If a transverse secton, perpendicular to the axis of the mandrel, is taken across the external sizing element, it may give an edge section which is more or less square as shown in Fig. 3, since the section line cuts diagonally across the crests and valleys of a plurality of the corrugations. The external sizing element 17 has an internal transverse diameter sufficiently larger than the mandrel to permit the passage of the strip therebetween. The sizing element is of such a length longitudinally of the mandrel as to accept the body of the strip with the flange extending free at one end, and the bead extending free at the other end. In order to relieve friction of the strip on the external forming element, provision is made, as hereinabove indicated, to admit a fluid lubricating medium under pressure. To this end, slots 19 are milled longitudinally of the sizing element, and are provided with ports 20 extending through the outer surface thereof. Suitable connections 21, which may be of flexible nature, are made between these ports, and a pump 22 conveniently located in the housing of the machine. This pump may be an ordinary gear pump, or other fluid moving device, and may be located in a reservoir of lubricant 23. The pump may be driven by a separate motor, or through suitable transmission, from the main motor of the device. It delivers lubricant under pressure to the milled slots 19, whereby it is distributed over the outer surface of the strip in the external sizing element, and is forced between this element and the strip by pressure. In practice, I locate a pan on a portion of the mandrel housing 15, adapted to catch lubricant which has passed between the sizing element and the strip, and re-deliver it by a suitable conduit to the reservoir 23.

Figure 10:
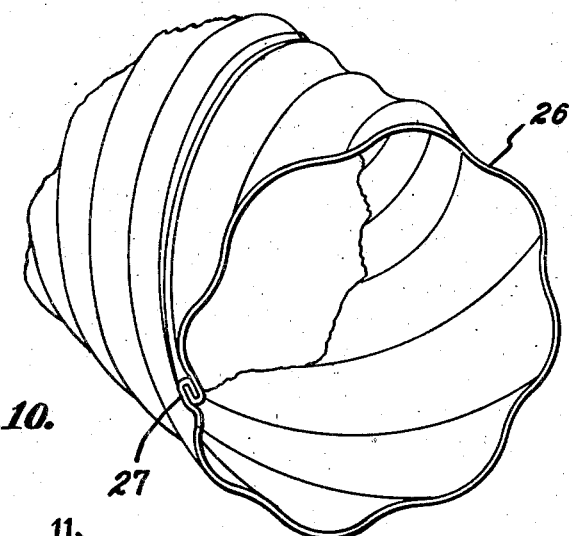
Fig. 10 is a perspective view of a section of helical lock seam pipe or culvert, made in accordance with the teachings of this invention.
Figure 13:
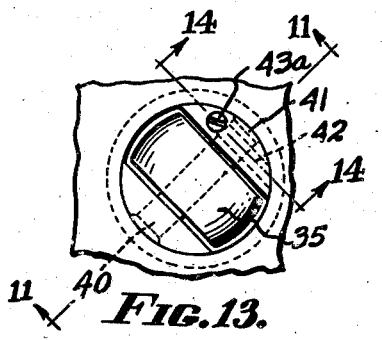
Figs. 11, 12, 13 and 14 are views of the hold-out roller and the mounting thereof in the mandrel, Fig. 14 being a sectional view taken along the lines 14, 14 of Fig. 13, and showing means for locking the roller in adjusted position.

The projecting flange or bead of the strip 6 may be guided beyond the edge of the external forming element by a suitably shaped guide member 24 (Fig. 22). This type of guide is of especial importance in preventing side slip of the material, where plain or uncorrugated pipe is being formed. The member 24 will, of course, be fixed to the mandrel, as by bolting. Where corrugated pipe is being formed, there is substantially no tendency to side slip. Any tendency for the flange to be caused to bend toward the mandrel during the helical progress of the strip may, under these circumstances, be counteracted by a small roller 25 (Fig. 24) bolted to the mandrel in proper position. It will be understood, of course, that the mandrel in operation extends diagonally across the sheet. Therefore, one edge of the sheet is bent around in a helical path, and the flange or bead thereon brought into helical engagement with the flange or bead on the opposite edge, just as said opposite edge reaches the mandrel. This will be readily appreciated from a consideration of Fig. 24, where the flanged edge of the sheet 6 is the portion thereof which first reaches the mandrel 13. The roller 25 corrects any distortion of this flange, and leads it directly into engagement with the bead on the strip. Hence, guides at both ends of the mandrel are not ordinarily necessary, especially where corrugated strip is being formed into helical pipe. As I have indicated above, the external sizing element 17 leads the strip into the desired helical path, helps to bring the seam elements, i. e. the bead 9 and flange 8 into inter-engagement, and serves positively to locate the rudimentary seam thus formed longitudinally of the mandrel. Operations in completing the pipe consist in clamping the bead against the flange, and then in progressively bending over the tight seam thus formed against the pipe. The final product is a conduit such as that illustrated at 26 in Fig. 10, having the seam construction 27. The series of seam forming operations are illustrated in Figures 4 to 8. In Fig. 4 the rudimentary seam construction 27a is shown as freshly formed. The next operation is the clamping of the bead against the flange by a pair of bevel rollers 28 and 29, as shown in Fig. 5. The seam is, in the meantime, supported from beneath by a roller 30 journaled in the mandrel, as will hereinafter be described. Next the seam is partially inclined by means of a flat roller 31 operating against a beveled roller 32, as shown in Fig. 6, the seam again being backed up by a mandrel roller 33. Next the seam is further inclined as shown in Fig. 7 by the action of a beveled and flanged roller 34, operating against a mandrel roller 35. Finally, the seam is clenched by the interaction of a pair of beveled and flanged rolls 36 and 37, the latter of which is mounted in the mandrel, as shown in Figs. 8 and 9.

Figure 14:
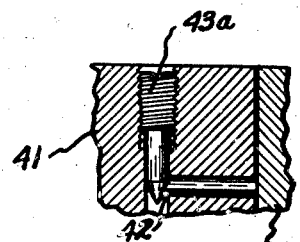
Figure 12:
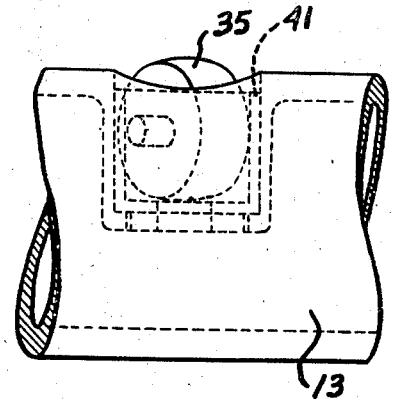
Figure 11:
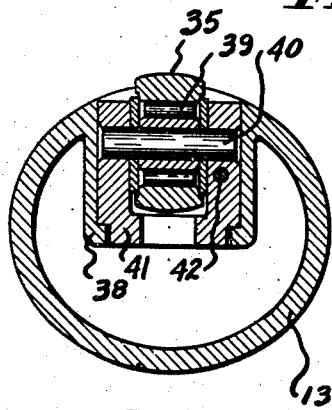
Figure 17:
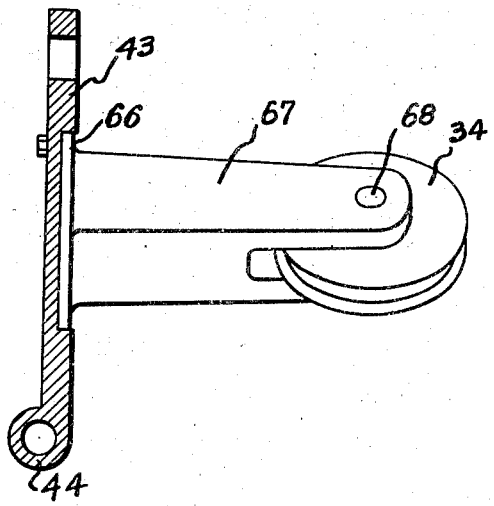
Fig. 17 is a view of the outer seaming roller and its holder which is used in the latter seaming operations, the holder being shown in section.
Figure 18:
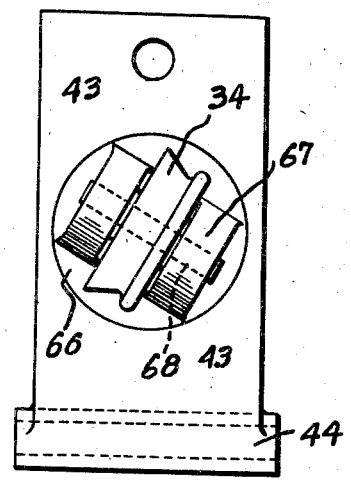
Fig. 18 is a vertical elevation of this roller and its mounting.

The mounting of the mandrel rolls is shown in Figs. 7, 9 and 11 to 14, inclusive, where it will be seen that there is formed in the body of the mandrel, a housing portion 38, which surrounds a circular perforation. Preferably the mandrel rolls will be ball or roller bearing, and the roll proper (for example, 35 in Fig. 11) will be mounted by means of the bearing structure 39 upon a shaft 40, which, in turn, is mounted in a circular block 41, fitting within the housing 38. The block 41 is thus rotatable in the housing 38 for the angular adjustment of the hold-out roller 35. For the adjustment of the parts in the proper angular relationship, I provide a suitable locking device. This may consist, as shown in Fig. 14, of a pin 42, the end of which is beveled, and a set screw 43a at right angles thereto, which set screw has a beveled end as shown. The pin 42 fits in a smooth perforation in the wall of the circular member 41, and the set screw 43a fits into a threaded perforation substantially at right angles thereto. As the set screw 43a is driven downwardly, the pin 42 is driven outwardly, thus binding against the wall of the housing 38, and fixing the roller mounting in angularly adjusted position. Releasing the set screw 43 will permit the turning of the roller mounting to a new angular position, as will be evident. I have hereinabove indicated that the external sizing element positively locates the seams of the helical pipe longitudinally of the mandrel. Hence, no provision need be made for the wandering of the mandrel rollers; and once these rollers are given the proper angular adjustment, they require no other adjustment, as long as the mandrel is serviceable.

The external seam forming rolls and their holders and mounting means will now be described more in detail. Again, as has been indicated, since the external sizing element positively locates the seams longitudinally of the mandrel, there is no necessity either to provide for longitudinal wandering of the external seam forming rollers, or for angular variations thereof during operation. Aside from their rotative movement, the rollers need only be capable of giving to a slight extent, in a direction radial to the mandrel, merely in order to take care of slight variations in size of the pipe due to camber in the strip. As a consequence, where external seam rollers are to be located at the sides of the structure, it is most convenient to form a mounting in the form of a leaf 43, as shown in Figs. 1, 2, 17 and 18. The leaf has a hinge or pivot portion 44 at its lower end, and this portion is fastened by means of a suitable gintle to perforated ears 45, integral with or attached to the mandrel frame or housing. The leaf can thus swing from vertical to horizontal. It may be held to the vertical position by means of screw members 46 passing through the leaf and threaded into the mandrel housing or frame, as shown, there being heavy compression springs 47 between the heads of these set screws and the leaf. Where portions of the seaming roll holders are to extend through the leaves, the leaves will be perforated, as readily understood. The roll holders proper are bolted to the leaves, and the holes for the passage of the bolts or set screws which accomplish this function, are preferably so placed as to enforce the attachment of the roll holders to the leaves in proper angular adjustment.

Where a roll holder is to be located above the mandrel, a variant of this structure is employed, wherein the upper plate of the mandrel housing 15 is perforated, as at 48, for the passage of the roll holder, and a leaf 49 is pivoted to ears 50, attached to the upper frame member or plate of the mandrel housing. A similar set screw 51 and spring arrangement may be employed in this case.

Figure 16:
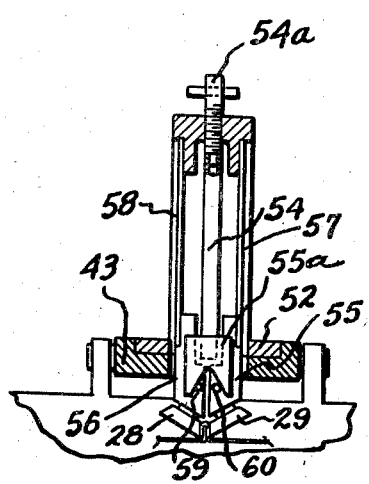
Figs. 15 and 16 illustrate the construction and mounting for the first unit of seaming rolls, the latter figure being a sectional view taken along the lines 16, 16 of Fig. 15.
Figure 15:
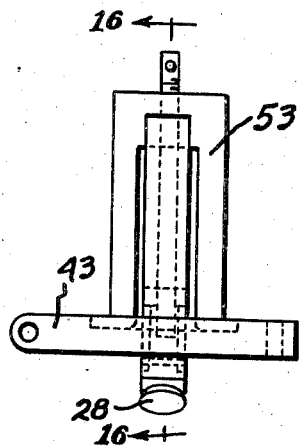

It will be noted at this point, that the various leaves and spring holding means go with the mandrel housing 15. The seam forming rollers and holders which will now be described, however, are interchangeable from mandrel to mandrel. Due to the different operations which these rollers are to perform, they vary somewhat in construction. The first of the seam forming rollers, i. e. the one employing the pair of beveled rolls shown at 28a and 29, in Fig. 5, has a holding structure such as that shown in Figs. 15 and 16. This is the seam forming assembly which first effects the compression of the bead against the flange in the helical pipe. Although the rudimentary seam will be positively located axially of the mandrel, yet the shape and disposition of its parts may vary somewhat, due both to inequalities in forming the flange and bead, and also to inequalities produced by flattening, or the like, during the helical travel of the strip between the mandrel and the external sizing device. Hence I have provided a structure comprising a perforated base plate 52, adapted for attachment to one of the leaves 43, and bearing an integral U-shaped standard 53. This standard carries a rod 54 adjustable by means of a swiveled set screw 54a threaded in the standard, terminating in a yoke member 55. The rollers 28 and 29 are journaled in blocks 55a and 56, which, in turn, are attached to leaf springs 57 and 58, mounted on the standard 53, at their upper ends. The blocks 55a and 56 bear pins 59 and 60, which engage in a V-shaped notch in the yoke member 55. The yoke member is bifurcated to accept the blocks 55a and 56, and there is a construction of pins and V-shaped notch on either side thereof.

It will be evident from this construction, that longitudinal adjustment of the rod 54 by means of the set screw 54a will increase or relieve the pressure between the rollers 28 and 29. Also, it will be evident that the blocks 55a and 56, by reason of their spring mountings 57 and 58, can rock about the pins 59 and 60 as pivots to accommodate irregularities in the stock as it reaches them, without substantial change in the pressure between them.

Figures 20, 21:
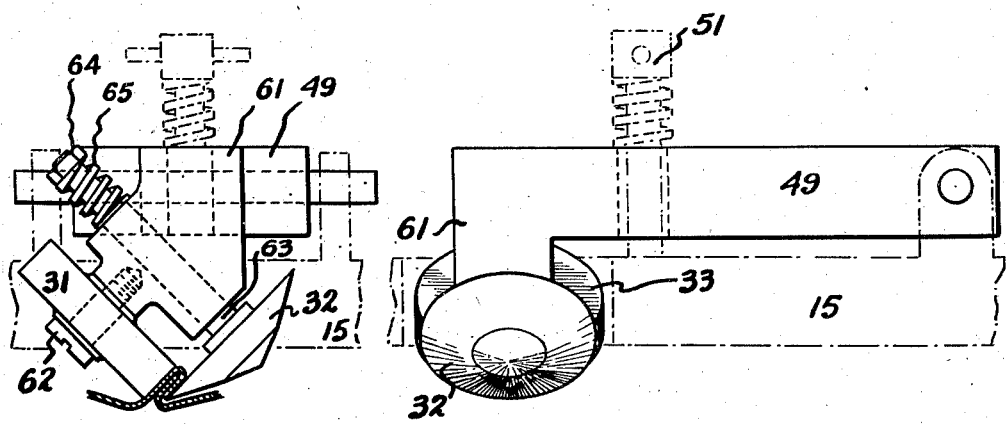
Fig. 20 is a front view of the second seaming unit.
Fig. 21 is a side elevation thereof.

The remainder of the roller holders may be fixed with reference to the mandrel longitudinally. The second seaming roll holder, usually one attached to a top leaf 49, may comprise, as shown in Figs. 20 and 21, a block 61, to which the seam roller 31 is pivoted, as by means of a pivot bolt 62, and which has a perforation substantially at right angles to the axis thereof for accepting the shaft 63 of the beveled roller 32. This roller may be given a slightly resilient mounting by threading a bolt 64 on the end of the shaft 63, and placing a compression spring 65 between this bolt and the block 61. The remainder of the holders for the seaming rollers may take the form shown in Figs. 17 and 18, where a base plate 66, adapted for attachment to the leaf 43, is provided with a bifurcated standard 67, in which a roll, for example, the roll 34, or the roll 36, is pivoted by means of a pivot pin 68. Any or all of the seaming rollers which I have described may be provided with suitable anti-friction bearings.

As hereinabove indicated, I prefer to provide in connection with the feeding mechanism, a suitable camber gauge and adjustment means, such as that illustrated in Figs. 25 to 28, inclusive.

The feed table indicated at 69 in these figures may be located between the first of the forming and feeding rolls 2 and the coil box 7. The table is provided with ears 70, in which may be threaded set screws 71, the inner ends of which engage guide members 72. It will be understood that both the interspacing and the positions of these guides relative to the table may be adjusted by means of these set screws. Fixed on the table 69 is a camber gauge comprising a base member 73, the interior construction of which will be most readily appreciated from a consideration of Fig. 28. The base is perforated to accept an operating rod 74, which may have longitudinal movement therein. In the figure, this rod is urged to the right by the engagement of a compression spring 75 with the left hand end thereof. Adjustment of the compression spring is attained by means of a set screw 76. The other or right hand end of the rod 74 forms a bifurcated yoke shown at 77, in which yoke there is pivoted a small grooved roller 78, which contacts the edge of the strip 6. An elongated pointer 79 passes through a slot in the rod 74, and is pivoted thereto as at 80. At a point closely adjacent this pivot point, it is also pivoted to the base member 73, as shown at 81. It will be clear that a relatively very small movement of the roller 78 will produce a greatly magnified movement of the outer end of the elongated pointer 79. A suitable scale 82 is held near the outer end of the pointer by means of an arm 83. In practice, I mark off on this scale a safe zone indicated at 84. Marked camber of the sheet, which usually will be held pressed against the opposite guide by means of the small roller 78, will cause a variation in the position of the pointer on the scale. The indicated safety zone is so chosen that variations in the position of the sheet edge, as shown by the pointer within this zone, will not interfere with the formation of successful seams in the operation of the machine. When, due to camber in the sheet, the pointer begins to move outside this safe zone, I have found that by an adjustment of the guides to bring the pointer back to the safe zone, which adjustment may be made during the running of the machine, I can compensate for this excessive or cumulative camber so as to permit the continued production of pipe with sound seams. This compensation is, of course, effected by varying slightly the direction of motion of the strip as it enters the forming and feeding rolls.

I have indicated hereinabove that with the provision of suitable flying cut-off mechanism, and suitable means for accumulating strip prior to welding, my machine may be made to operate continuously during any given run.

The mode of operation of my machine has been made clear in connection with the description of the general features of the mechanism and process aspects of the invention, which precedes the specific description of the mechanism.

Modifications may be made in my invention without departing from the spirit thereof.

Having thus described my invention, what I claim as new and desire to secure by Letters Patent, is:—

1. In a device for forming helical lock seam pipe, means for forming seam elements on the edges of metal strip, feeding means, a mandrel located with its axis at an angle to the direction of feed of said feeding means, a rigid forming member located about the said mandrel and fixed with respect to said mandrel and said feeding means, said feeding means serving to force said strip between said mandrel and said rigid forming member, said rigid forming member serving to form said strip into helical convolutions with said seam members interengaged and to locate the seam thus formed in a fixed position relative to said mandrel in any plane passing through the axis thereof during the progressive formation and rotation of said pipe, and means cooperating with said rigid forming member for correcting distortion of one of said seam forming elements during the formation of said helical convolutions.

2. In a device for forming helical lock seam pipe, means for forming seam elements on the edges of metal strip, feeding means, a mandrel located with its axis at an angle to the direction of feed of said feeding means, a rigid forming member located about the said mandrel and fixed with respect to said mandrel and said feeding means, said feeding means serving to force said strip between said mandrel and said rigid forming member, said rigid forming member serving to form said strip into helical convolutions with said seam members interengaged and to locate the seam thus formed in a fixed position relative to said mandrel in any plane passing through the axis thereof during the progressive formation and rotation of said pipe, and a series of seam forming devices in substantially fixed positions axially of said mandrel acting progressively to clamp said seam forming members in interengagement and to incline the seam thus formed, said members having resilient mountings for movement in directions radial of said mandrel.

3. In a device for forming helical lock seam pipe, means for forming seam elements on the edges of metal strip, feeding means, a mandrel located with its axis at an angle to the direction of feed of said feeding means, a rigid forming member located about the said mandrel and fixed with respect to said mandrel and said feeding means, said feeding means serving to force said strip between said mandrel and said rigid forming member, said rigid forming member serving to form said strip into helical convolutions with said seam members interengaged and to locate the seam thus formed in a fixed position relative to said mandrel in any plane passing through the axis thereof during the progressive formation and rotation of said pipe, and a series of seam forming devices in substantially fixed positions axially of said mandrel acting progressively to clamp said seam forming members in interengagement and to incline the seam thus formed, said members having resilient mountings for movement in directions radial of said mandrel, said members comprising forming rolls located externally of said pipe and backing rolls located in said mandrel.

4. In a device for forming helical lock seam pipe, means for forming seam elements on the edges of metal strip, feeding means, a mandrel located with its axis at an angle to the direction of feed of said feeding means, a rigid forming member located about the said mandrel and fixed with respect to said mandrel and said feeding means, said feeding means serving to force said strip between said mandrel and said rigid forming member, said rigid forming member serving to form said strip into helical convolutions with said seam members interengaged and to locate the seam thus formed in a fixed position relative to said mandrel in any plane passing through the axis thereof during the progressive formation and rotation of said pipe, means for varying the angle to the axis of the mandrel at which strip is led into said forming and feeding means to compensate for cumulative or excessive camber in said strip, said means comprising a feed table, guides on said feed table, and means for adjusting said guides to vary said direction of feed.

5. In a device forming helical lock seam pipe, means for forming seam elements on the edges of metal strip, feeding means, a mandrel located with its axis at an angle to the direction of feed of said feeding means, a rigid forming member located about the said mandrel and fixed with respect to said mandrel and said feeding means, said feeding means serving to force said strip between said mandrel and said rigid forming member, said rigid forming member serving to form said strip into helical convolutions with said seam members interengaged and to locate the seam thus formed in a fixed position relative to said mandrel in any plane passing through the axis thereof during the progressive formation and rotation of said pipe, means for varying the direction in which strip is led into said forming and feeding means to compensate for cumulative or excessive camber in said strip, said means comprising a feed table, guides on said feed table, means for adjusting said guides to vary said direction of feed, said table also carrying a camber gauge comprising indicating means, means fixed on said table, and means contacting the edge of a strip moving thereacross.

6. In a device of the character described, in combination with feeding and corrugating rolls, a mandrel having an angular relation thereto, a rigid sheath or external sizing element surrounding said mandrel to an extent sufficient at least to produce matching helical convolutions in a strip of material forced between said material and said element, said element being generally of helical shape, and having on its inner surface helically disposed corrugations matching the corrugations produced in said strip.

7. In a device of the character described, in combination with feeding and corrugating rolls, a mandrel having an angular relation thereto, a rigid sheath or external sizing element surrounding said mandrel to an extent sufficient at least to produce matching helical convolutions in a strip of material forced between said material and said element, said element being generally of helical shape, and having on its inner surface helically disposed corrugations matching the corrugations produced in said strip, said element having slots therein transverse to said corrugations and passageways to said slots through the external periphery of said element, whereby a lubricant fluid can be supplied to said element and forced between said element and said strip.

8. In a device of the character described, a mandrel, a mandrel frame, a leaf having at one end a fixed pivot on said mandrel frame, resilient means at the other end of said leaf for urging said leaf toward said frame, a standard mounted on said leaf, and a forming device for the seam of a helical pipe mounted rotatively on said standard.

9. In a device of the character described, a mandrel, a mandrel frame, a leaf pivoted at one end to said mandrel frame, resilient means at the other end of said leaf for urging said leaf toward said frame, a standard mounted on said leaf, a forming device for the seam of a helical pipe mounted rotatively on said standard, said standard being detachable from said leaf, and means for attaching said standard to said leaf with a predetermined angular relationship between the axis of said forming device and the axis of said mandrel.

10. In a device of the character described, a seam forming element comprising a standard, a pair of rolls mounted in blocks, leaf springs attaching said blocks to said standard, pins on said blocks, an adjustment member having a V-shaped notch engaging said pins, and means for adjustably connecting said adjustment member with said standard, whereby upon movement of said adjustment means, the pressure between said rolls may be varied, while said blocks carrying said rolls may rock on said pins as pivots, against the stiffness of said leaf springs.

11. In a device of the character described, in combination with feeding and corrugating rolls, a mandrel having an angular relation thereto, a rigid sheath or external sizing element surrounding said mandrel to an extent sufficient at least to produce matching helical convolutions in a strip of material forced between said material and said element, said element being generally of helical shape, and having on its inner surface helically disposed corrugations matching the corrugations produced in said strip, said element having passageways through the external periphery of said element, whereby a lubricant fluid can be supplied to said element and forced between said element and said strip.

12. In a device for forming helical lock seam pipe from strip material having inherent defects of temper, gauge and camber, a frame, a mandrel, feeding means, a rigid forming member located about the said mandrel, said feeding means serving to force said strip between said mandrel and said rigid forming member, said rigid forming member serving to form said strip into helical convolutions with said seam members inter-engaged and to locate the seam thus formed in a fixed position relative to said mandrel in any plane passing through the axis thereof during the progressive formation and rotation of said pipe, and means for compressing said seam mounted on said frame for resilient motion in a direction radial to the pipe.

JONATHAN ROY FREEZE.